US011457383B2

(12) United States Patent
Hansson et al.

(10) Patent No.: US 11,457,383 B2
(45) Date of Patent: Sep. 27, 2022

(54) CONTROL NODE, PROCESS NODE AND METHODS PERFORMED THEREIN FOR A CONTROL PROCESS ON RADIO ACCESS BEARERS

(71) Applicant: Telefonaktiebolaget LM Ericsson (publ), Stockholm (SE)

(72) Inventors: Göran Hansson, Stockholm (SE); Stefan Eng, Linköping (SE); Torbjörn Örtengren, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 264 days.

(21) Appl. No.: 15/733,017

(22) PCT Filed: Sep. 7, 2017

(86) PCT No.: PCT/SE2017/050884
§ 371 (c)(1),
(2) Date: Feb. 27, 2020

(87) PCT Pub. No.: WO2019/050441
PCT Pub. Date: Mar. 14, 2019

(65) Prior Publication Data
US 2020/0260329 A1  Aug. 13, 2020

(51) Int. Cl.
*H04W 28/16* (2009.01)
*H04W 88/08* (2009.01)

(52) U.S. Cl.
CPC .......... *H04W 28/16* (2013.01); *H04W 88/085* (2013.01)

(58) Field of Classification Search
CPC ..... H04W 28/02; H04W 28/16; H04W 76/10; H04W 76/15; H04W 76/34; H04W 88/085
See application file for complete search history.

(56) References Cited

U.S. PATENT DOCUMENTS

| 2015/0018010 | A1  | 1/2015  | Fischer |
| 2015/0181481 | A1* | 6/2015  | Masini ............. H04W 36/0085 455/436 |
| 2015/0365790 | A1  | 12/2015 | Edge et al. |

(Continued)

FOREIGN PATENT DOCUMENTS

WO  2009/128754 A1  10/2009

OTHER PUBLICATIONS

ZTE, "UE radio bearer management over F1 interface for TS38.473", 3GPP Draft; R3-172921 Aug. 21, 2017 (Year: 2017).*

(Continued)

*Primary Examiner* — Khaled M Kassim
*Assistant Examiner* — Zhaohui Yang
(74) *Attorney, Agent, or Firm* — Nicholson De Vos Webster & Elliott LLP (57) ABSTRACT

A method performed by a control node for handling communication of data of one or more wireless devices in a wireless communications network. The control node triggers a control process on radio access bearers (RAB) and identifies more than one RAB, to perform the control process on, for at least one wireless device. The control node further bundles control information associated with the identified more than one RAB in a control signal; and provides to a process node, the control signal for the identified more than one RAB.

10 Claims, 8 Drawing Sheets

(56) References Cited

U.S. PATENT DOCUMENTS

2020/0178326 A1* 6/2020 Sirotkin ............... H04W 76/12

OTHER PUBLICATIONS

Erik Westerberg, "4G/5G RAN Architecture: How a Split Can Make the Difference: Virtualize, Split, and Reorganize," Jul. 22, 2016, 16 pages, Ericsson Technology Review, Charting the Future of Innovation, vol. 93, Ericsson AB.
Huawei et al., "TP for Bearer Management over F1 to 38.473," 3GPP TSG RAN WG3 NR AdHoc, R3-172192, Jun. 27-29, 2017, 2 pages, Qingdao, China.
International Preliminary Reporton Patentability, PCT App. No. PCT/SE2017/050884, dated Mar. 19, 2020, 11 pages.
International Search Report and Written Opinion, PCT App. No. PCT/SE2017/050884, dated May 11, 2018, 15 pages.
Nokia et al., "RSTD Measurement and Reporting in NB-IoT," 3GPP TSG RAN WG1 Meeting #87, R1-1611303, Nov. 14-18, 2016, 2 pages, Reno, USA.
Sven Fischer, "Observed Time Difference of Arrival (OTDOA) Positioning in 3GPP LTE," Jun. 6, 2014, 62 pages, Qualcomm Technologies, Inc.
ZTE, "Discussion on UE Context and Radio Bearer Management over F1 Interface," 3GPP TSG RAN WG3 NR AD HOC, R3-172352, Jun. 27-29, 2017, 5 pages, Qingdao, China.
ZTE, "UE Radio Bearer Management over F1 Interface for TS38. 473," 3GPP TSG RAN WG3 NR#97, R3-172921, Aug. 21-25, 2017, 9 pages, Berlin, Germany.
Communication under Rule 71(3) EPC for EP App. No. 17777399. 1, dated Feb. 8, 2021, 60 pages.
Decision to Grant for EP App. No. 17777399.1, dated Mar. 18, 2021, 2 pages.

* cited by examiner

CONTROL NODE, PROCESS NODE AND METHODS PERFORMED THEREIN FOR A CONTROL PROCESS ON RADIO ACCESS BEARERS

CROSS-REFERENCE TO RELATED APPLICATIONS

This application is a National stage of International Application No. PCT/SE2017/050884, filed Sep. 7, 2017, which is hereby incorporated by reference.

TECHNICAL FIELD

Embodiments herein relate to a control node, process node and methods performed therein. Furthermore, a computer program and a computer readable storage medium are also provided herein. In particular, embodiments herein relate to handle or enable communication of data of one or more wireless devices in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a "NodeB" or "eNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network also referred to as New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. An interface between the radio network node and core network nodes is defined as an S1 interface.

In further developments of systems a distributed radio network node architecture has been discussed. The distributed radio network node architecture such as a distributed eNodeB may constitute of the following distributed functional entities:

A Radio Control Function (RCF) also referred to as control function;

A Packet Processing Function (PPF) also referred to as process function;

A Radio Processing Function (RPF) also referred to as radio function.

The RCF terminates a control plane signaling interface towards a core network and may be implemented in a control node. Via the control plane interface, the RCF receives requests to set up Radio Access Bearers (RAB) for transport of user data between the core network and the radio network node.

The PPF terminates a user plane interface towards a core network and may be implemented in a process node. The PPF handles processing of the protocols used for transport of RAB data between the core network and the radio network node, and between the PPF and the RPF. Further the PPF handles processing for the upper layer part of the protocols used to transport user data between the PPF and a wireless device over a radio interface.

The RPF handles processing of the protocols used for transport of user data between the PPF and the RPF, and the lower layer protocols, e.g. layer 1 and 2, used for transport of user data between the RPF and a wireless device over a radio interface. The RPF may be implemented in a radio node such as a base station.

The RCF controls set up and release of RABs, including packet processing functions for the RABs, in PPF and RPF. The RCF can also perform other control operations on RABs. For example, temporarily release of radio resources for a RAB, while keeping a RAB context in the PPF. This is called a RAB suspend procedure. RAB context may comprise e.g. S1-U transport parameters; IP address and Tunnel endpoint Identifier (TEID); Point to Point (PP) Bearer Identifier (ID); Wireless device Category Info; and Packet Data Convergence Protocol (PDCP) buffer memory. The reversed procedure to set up radio resources is called a RAB resume procedure. RCF uses control plane signaling interfaces between RCF and PPF, and between RCF and RPF respectively to perform control operations on RABs.

Using the distributed radio network node architecture may result in a large amount of signaling that may imply an increase of service availability latency of the wireless communications network. This results in a limited or reduced performance of the wireless communications network.

SUMMARY

An object herein is to provide a mechanism that improves performance of a wireless communications network in an efficient manner.

According to an aspect the object is achieved by providing a method performed by a control node for handling communication of data of one or more wireless devices in a wireless communications network. The control node triggers a control process on RABs, and identifies more than one RAB, to perform the control process on, for at least one wireless device. The control node bundles control information associated with the identified more than one RAB in a control signal, and provides, to a process node, the control signal for the identified more than one RAB.

According to another aspect the object is achieved by providing a method performed by a process node for handling communication of data of one or more wireless devices in a wireless communications network. The process node obtains from a control node, a control signal related to a control process on RABs, which control signal comprises control information associated with more than one RAB for at least one wireless device. The process node further performs the control process based on the received control signal.

According to yet another aspect the object is achieved by providing a control node for handling communication of data of one or more wireless devices in a wireless communications network. The control node is configured to trigger a control process on RABs, and to identify more than one RAB, to perform the control process on, for at least one wireless device. The control node is further configured to bundle control information associated with the identified more than one RAB in a control signal, and to provide to a process node, the control signal for the identified more than one RAB.

According to still another aspect the object is achieved by providing a process node for handling communication of data of one or more wireless devices in a wireless communications network. The process node is configured to obtain from a control node, a control signal related to a control process on RABs, which control signal comprises control information associated with more than one RAB for at least one wireless device. The process node is further configured to perform the control process based on the received control signal.

It is furthermore provided herein a computer program comprising instructions, which, when executed on at least one processor, cause the at least one processor to carry out any of the methods above, as performed by the control node or the process node. It is additionally provided herein a computer-readable storage medium, having stored thereon a computer program comprising instructions which, when executed on at least one processor, cause the at least one processor to carry out the method according to any of the methods above, as performed by the control node or the process node.

Embodiments herein bundle information in the control signal regarding multiple RABs in e.g. request signals and, in some embodiments, confirm signals or responses. This will reduce the signaling load, between the process node and the control node, and thereby lower service availability latency. Thus, control information relating to operations on multiple RABs belonging to a single wireless device are bundled but also may embodiments herein further be applied so that operations on RABs belonging to multiple wireless devices are bundled. Examples of control processes for which the proposed solution may be applied are: RAB setup; RAB release; RAB suspend; and RAB resume.

BRIEF DESCRIPTION OF THE DRAWINGS

Embodiments will now be described in more detail in relation to the enclosed drawings, in which.

DETAILED DESCRIPTION

Figure 1:
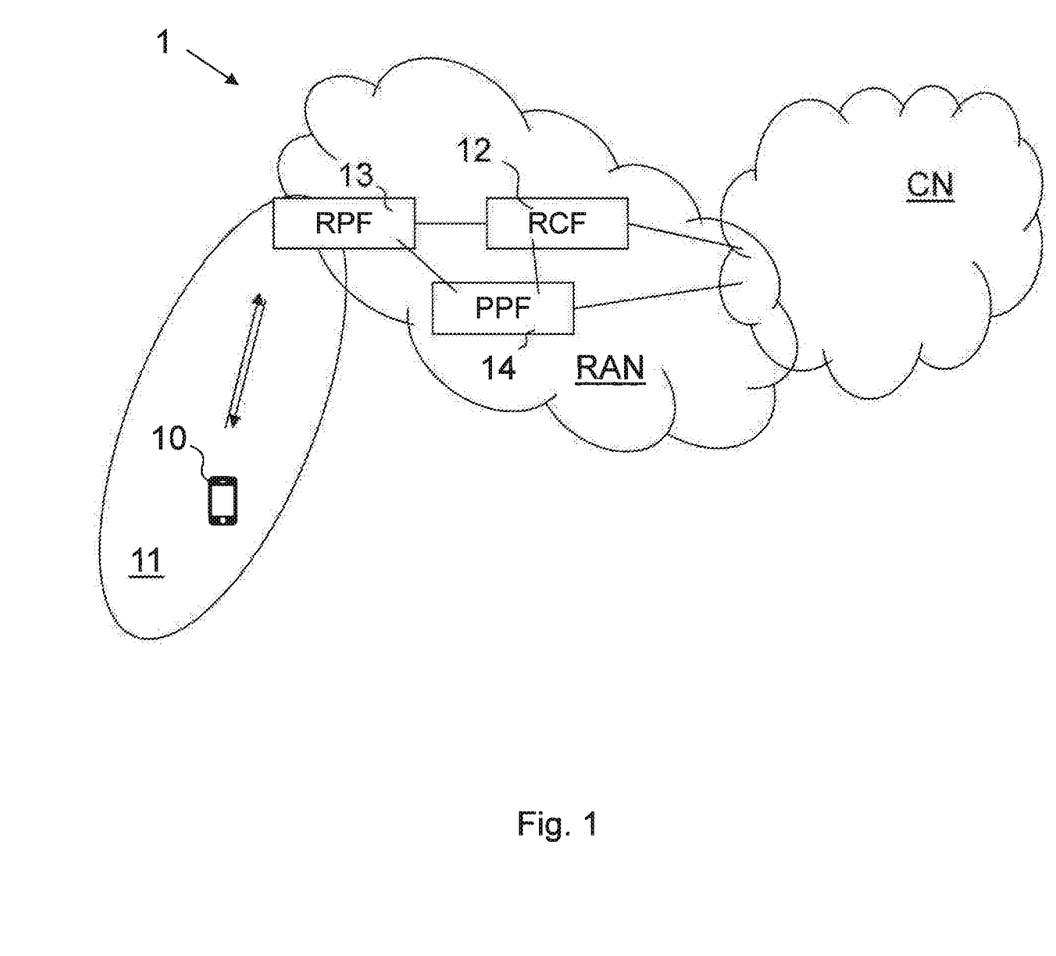
FIG. 1 is a schematic diagram depicting a wireless communications network according to embodiments herein.

Embodiments herein relate to wireless communications networks in general. FIG. 1 is a schematic overview depicting a wireless communications network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communications network 1, a wireless device 10, such as a wireless terminal, a mobile station, a non-access point (non-AP) station (STA), a STA, a user equipment and/or a wireless terminals, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a service area.

The wireless communications network 1 comprises one or more distributed radio network nodes comprising a packet processing function (PPF), a radio processing function (RPF), and a radio control function (RCF). The functions may be distributed over one or more network nodes in the RAN. E.g. the radio control function is handled by a control node 12, the radio processing function is handled by a radio process node 13, and the packet processing function may be handled by a process node 14. The different nodes may be stand-alone nodes or parts of one or more nodes. The distributed radio network node may comprise any wireless device or a radio network node providing radio coverage over a geographical area referred to as service area 11 or cell of a first radio access technology (RAT), such as NR, LTE, Wi-Fi or similar. A radio network node may also serve multiple cells, and may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used.

According to embodiments herein, the control node 12 is triggered, when running RAB operations, to bundle control information of more than one RAB in a control signal and provide the control signal to the process node 14. Thus, embodiments herein provide a signaling efficient manner of handling control processes for multiple RABs.

Control processes, e.g. RAB setup and RAB release procedures, constitute the main part of the traffic load for the control node 12. Furthermore, bearer setup latency is crucial to keep as low as possible, and will be even more so in e.g. 5G networks. Bundling multiple bearers in every setup and release signaling procedure according to embodiments herein will significantly reduce signaling load and service availability latency. Especially for the RAB suspend—RAB resume procedure when introduced since this may give an even higher traffic load for the control node 12, which may also be referred to as a RCF node.

It should be noted that the functions may be distributed differently and denoted differently e.g. the process node 14 may be denoted central unit-user plane (CU-UP) node and the control node 12 may be denoted central unit-control plane (CU-CP) node. The radio process node 13 may be denoted distributed unit.

Figure 2:
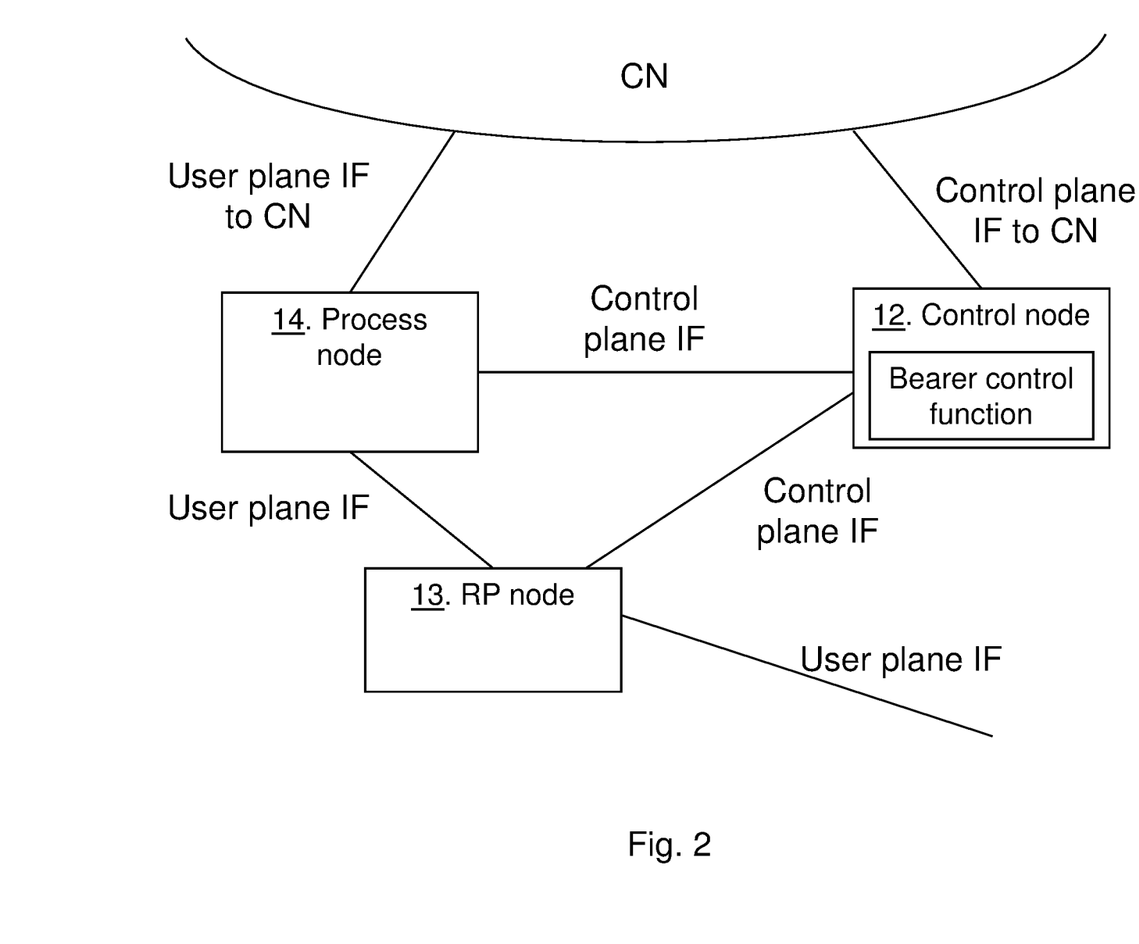
FIG. 2 is a schematic design illustrating the distributed radio network node architecture according to embodiments herein.

FIG. 2 shows a schematic overview depicting the distributed radio network node architecture with interfaces (IF), control plane (CP) IF and user plane (UP) IF, between the process node 14, the radio process node 13, and the control node 12. The control node 12 may comprise a bearer control function that bundles control information for multiple bearers in e.g. bearer set up and bearer release signals sent to PPF functions.

Furthermore, a virtualization of the distributed radio network node architecture may be implemented in a cloud implementation. The RCF and PPF, possibly also the RPF functions can be implemented as separate nodes in a cloud implementation. Since control plane signalling may be costlier with separate nodes in a cloud environment, the benefit of embodiments herein will be even more prominent. A virtualized RCF is referred to as a Virtualized Radio Control (vRC) function and a virtualized PPF is referred to as a Virtualized Packet Processing (vPP) function. A vRC and a vPP may together be referred to as a Control Unit or Central Unit (CU).

Figure 3:
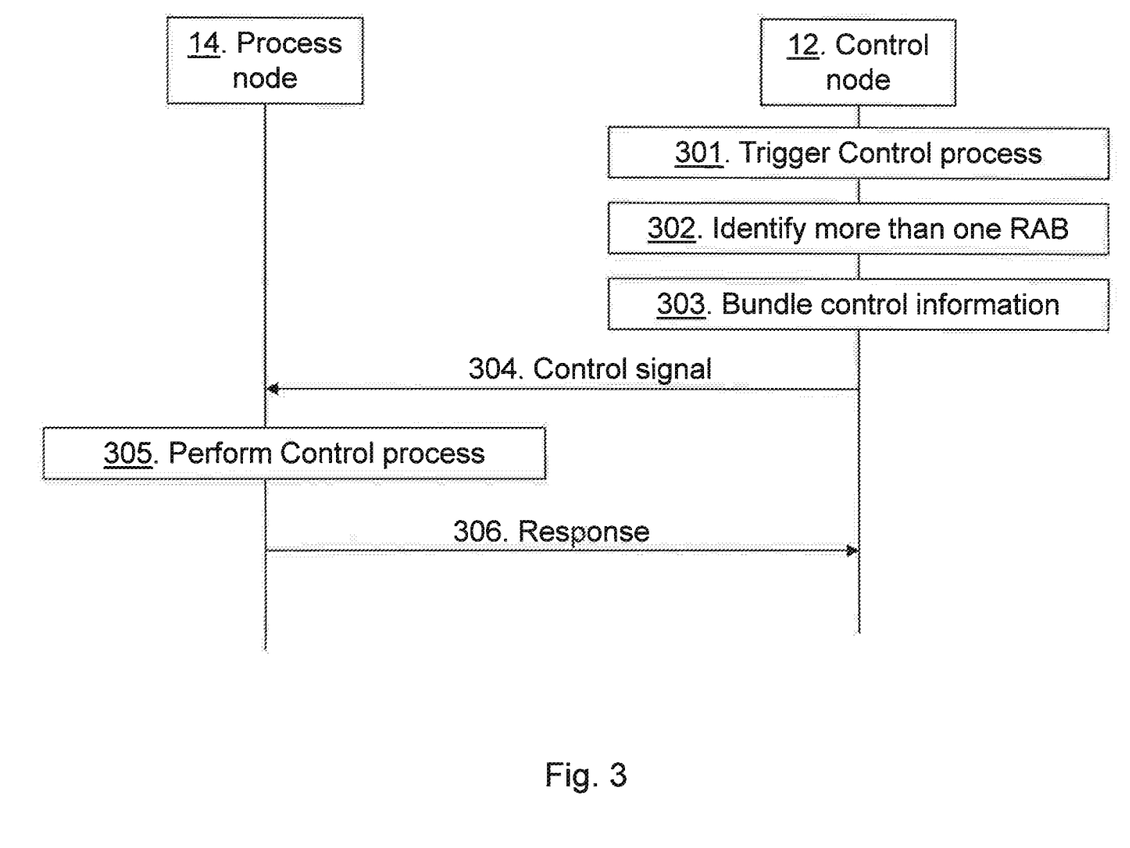
FIG. 3 shows a combined signaling scheme and flowchart according to embodiments herein.

FIG. 3 is a combined flowchart and signaling scheme according to some embodiments herein.

Action 301. The control node 12 may receive a request from the core network via the control plane interface to create a wireless device context in the distributed radio network node, such as an eNodeB, with a set of RABs for the wireless device 10. This triggers the control node 12 to initiate a control process on RABs. The request may be carried in a S1 Application Protocol or similar.

Action 302. The control node 12 is then configured to identify a number of RABs being linked to the event or request. E.g. a RAB setup request for a Voice over IP (VoIP) may further trigger to setup other RABs of other services for that wireless device 10. RAB bearers may be explicitly listed in an E-RAB SETUP REQ, E-RAB RELEASE REQ, or INITIAL CONTEXT SETUP REQ. Alternatively or additionally, the RABs may be identified based on identity of a wireless device e.g. in a UE CONTEXT SUSPEND or RESUME procedure.

Action 303. According to embodiments herein the control node then that bundles control information for multiple RABs in bearer set up and bearer release signals into a control signal. Such control information may be: a list of bearers to set up with e.g. information common for many bearers, such as wireless device category, ciphering algorithm, ciphering key. Furthermore, the control information may comprise information specific per bearer such as bearer identity, S1-U transport parameters, IP address and TEID, PDCP configuration, PDCP sequence number size, active queue management (AQM) parameters, quality of service class index (QCI). The control information may comprise list of bearers to release with e.g. bearer identity.

Action 304. The control node 12 then send the control signal to the process node 14 such as a PPF node. The control signal may be transmitted using a bearer application protocol.

Action 305. The process node 14 receives the control signal and performs multiple RAB operations, such as setup and/or release RABs, based on the bundled control information in the control signal.

Action 306. The process node 14 may then confirm and/or reject each RAB operation back to the control node 12. The confirmations and/or rejections may be bundled in a response back to the control node 12.

Figure 4:
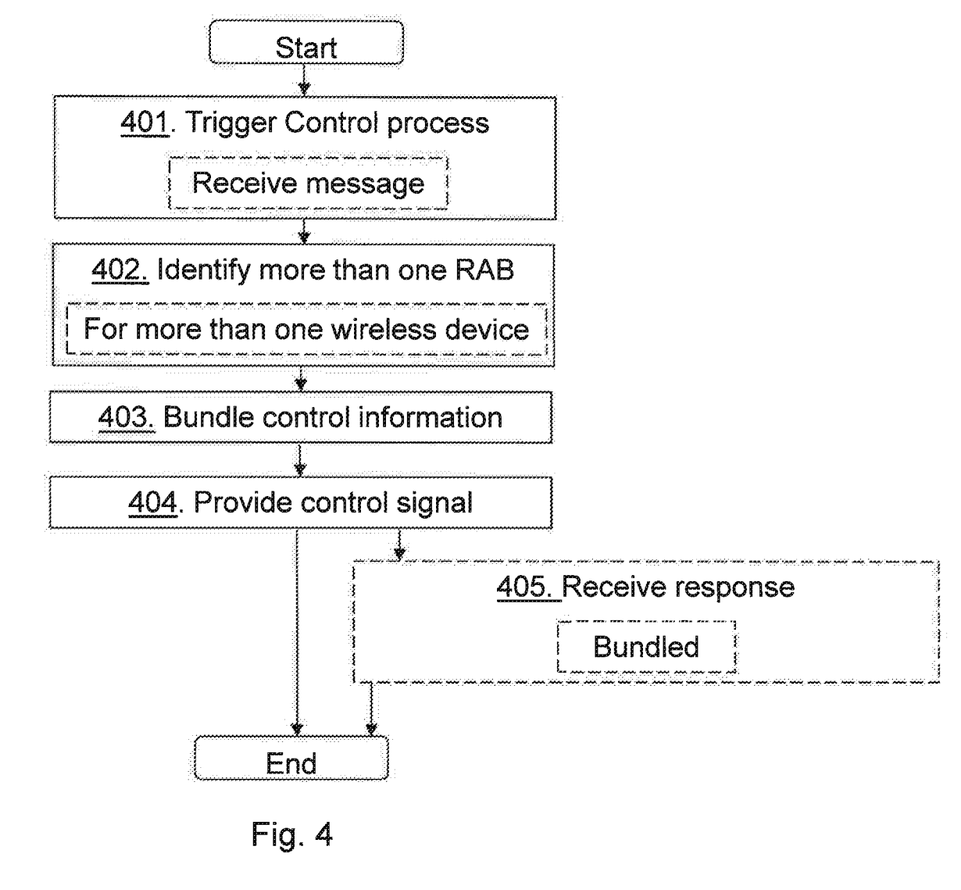
FIG. 4 shows a flowchart depicting a method performed by a control node according to embodiments herein.

The method actions performed by the control node 12 for handling communication of data of one or more wireless devices, such as the wireless device 10, in the wireless communications network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 401. The control node 12 triggers a control process on RABs. Control processes on RABs may be triggered by different types of events. For example, the control process may be triggered by receiving a message relating to a process associated with at least one RAB, such process may be RAB setup or RAB release. This message may e.g. be: a request from a core network node such as an mobility management entity (MME), via the control plane interface, to create a wireless device context in a radio network node with a set of RABs for the wireless device 10; a request from the core network node, via the control plane interface, to remove a wireless device context with associated RABs in the distributed radio network node; a message related to a fault scenario resulting in a cleanup procedure where many wireless device contexts with associated RABs are released, or a message indicating or related to a configuration or reconfiguration of one or more RABs e.g. in a handover process. The control process may be a RAB setup, a RAB resume, a RAB suspend or a RAB release.

Action 402. The control node 12 further identifies more than one RAB for at least one wireless device, such as the wireless device 10, to perform the control process on. The control node 12 may identify the more than one RAB for more than one wireless device. The control node 12 may e.g. receive a request for a service for the wireless device 10 and by default this will trigger setup of a plurality of RABs e.g. for other services.

Action 403. The control node 12 further bundles control information associated with the identified more than one RAB in a control signal.

Action 404. The control node 12 provides, such as transmits, to the process node 14, the control signal for the identified more than one RAB. The control signal may be transmitted over a control plane interface.

Action 405. The control node 12 may further receive a response, from the process node 14, associated with the control signal. The response may e.g. comprise bundled confirmations and/or rejections, bundled in a message, of the control process of the one or more RABs. E.g. bundled confirmations of RAB setups mixed with rejections of RAB setups, regarding the one or more RABs in the received control signal.

Figure 5:
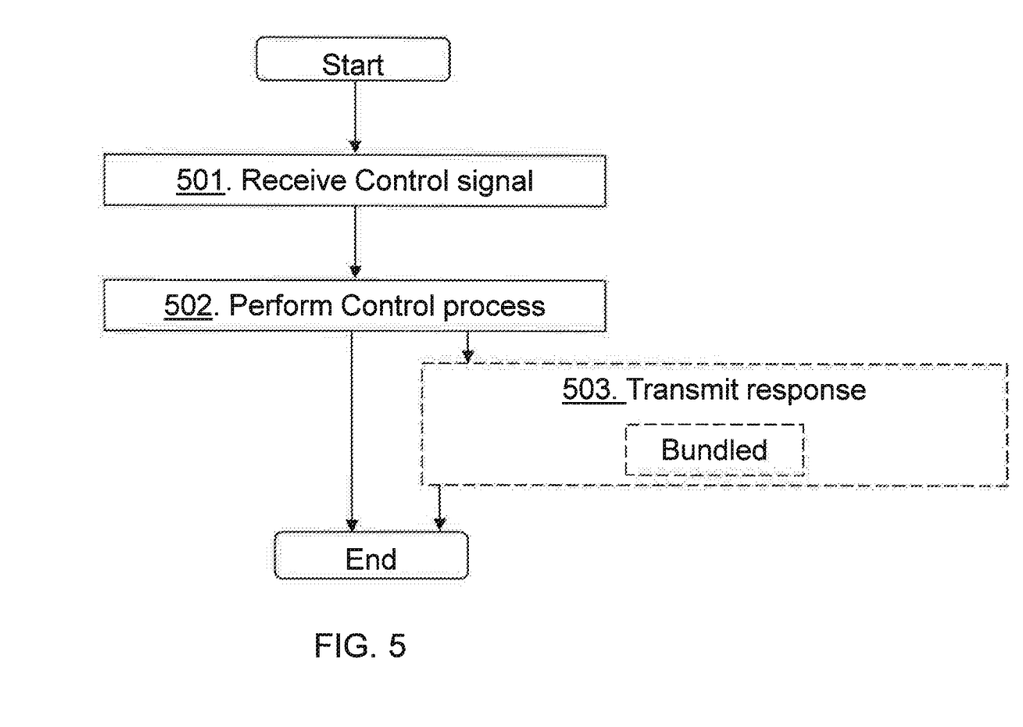
FIG. 5 shows a flowchart depicting a method performed by a process node according to embodiments herein.

The method actions performed by the process node 14 for handling communication of data of one or more wireless devices, such as the wireless device 10, in the wireless communications network according to some embodiments will now be described with reference to a flowchart depicted in FIG. 5. The actions do not have to be taken in the order stated below, but may be taken in any suitable order. Actions performed in some embodiments are marked with dashed boxes.

Action 501. The process node 14 obtains from the control node 12, the control signal related to the control process on RABs, which control signal comprises bundled control information associated with more than one RAB for at least one wireless device.

Action 502. The process node 14 further performs the control process based on the received control signal. E.g. releases RABs or sets up RABs for one or more wireless devices.

Action 503. The process node 14 may further transmit to the control node 12, the response associated with the control signal. The response may comprise bundled confirmations and/or rejections of the control process for one or more RABs. The process node 14 may perform bundling of responses for RABs for one wireless device or multiple wireless devices.

Figure 6:
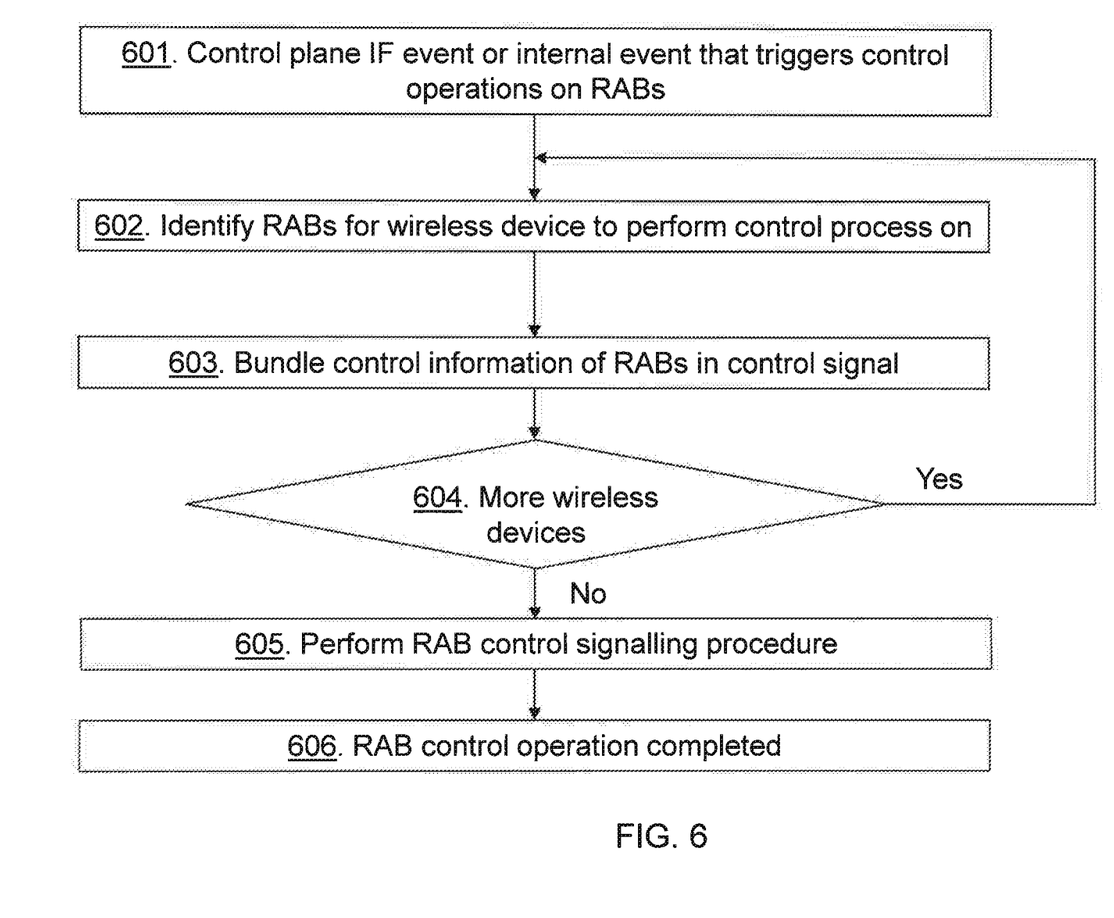
FIG. 6 shows a flowchart depicting a method according to some embodiments herein.

FIG. 6 is a schematic flowchart depicting some embodiments disclosed herein

Action 601. Control plane IF event or internal event occurs that triggers control operations on RABs. For example, receives a request of setting up one or more services for one or more wireless devices.

Action 602. The control node 12 identifies RABs for the wireless device to perform control process on.

Action 603. The control node 12 bundles control information of the identified RABs in the control signal.

Action 604. The control node 12 determines whether there are any other wireless device that may be involved in control operations on RABs. In that case return to action 602.

Action 605. That not being the case, the control node 12 and process node 14 perform a RAB control signalling procedure.

Action 606. The RAB control operation is then completed.

Figure 7:
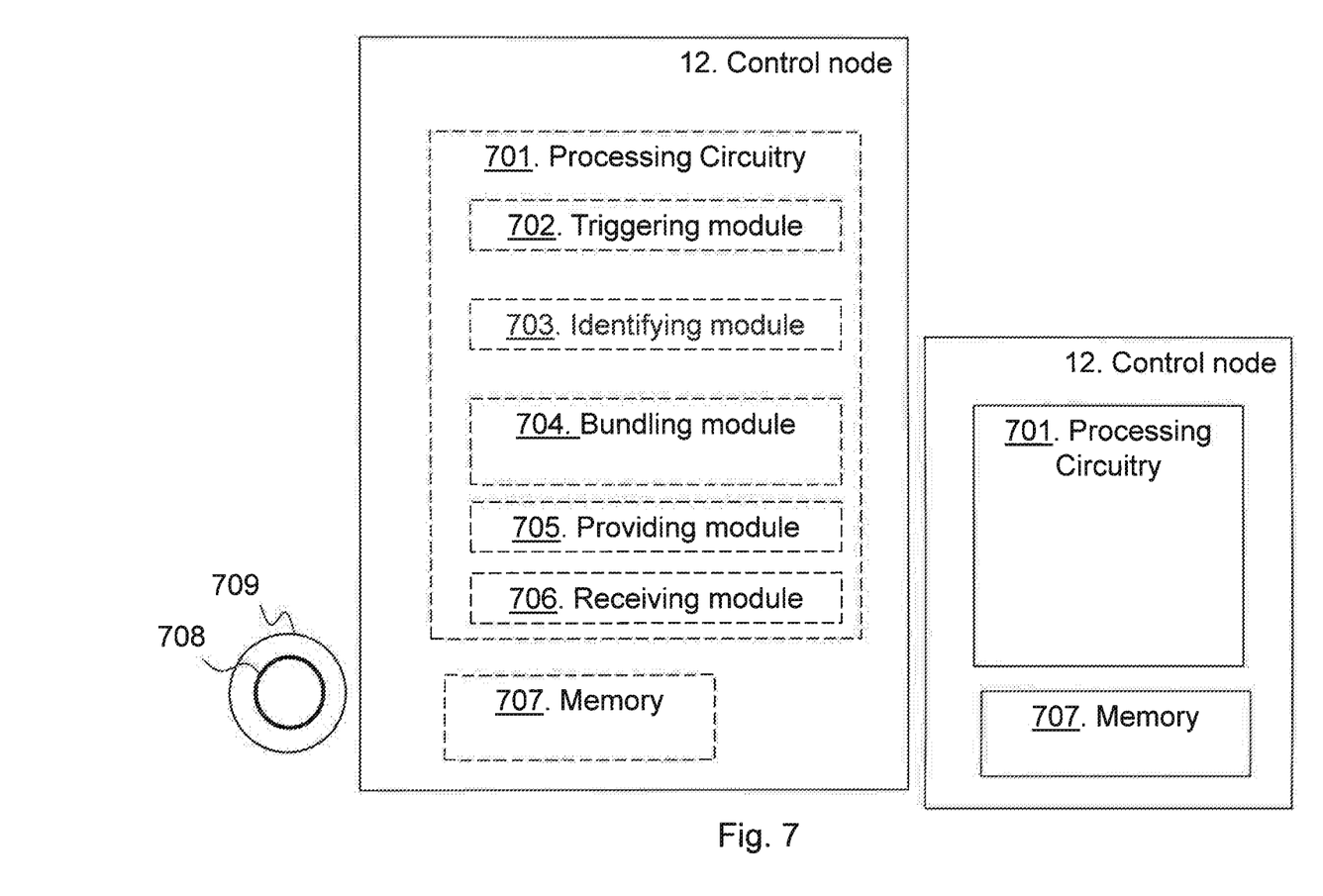
FIG. 7 shows a block diagram depicting a control node according to embodiments herein.

FIG. 7 is a schematic block diagram depicting the control node 12 for handling communication of data of one or more wireless devices in the wireless communications network 1.

The control node 12 may comprise a processing circuitry 701, e.g. one or more processors, configured to perform the methods herein.

The control node 12 may comprise a triggering module 702. The control node 12, the processing circuitry 701, and/or the triggering module 702 is configured to trigger the control process on RABs. The control process may be triggered by receiving the message relating to a process associated with at least one RAB. The message may e.g. be: a request from a core network node, via a control plane interface, to create a wireless device context in the radio control node with a set of RABs for the wireless device; a request from the core network node, via the control plane interface, to remove a wireless device context with associated RABs in the distributed radio network node; a message related to a fault scenario resulting in a cleanup procedure where the wireless device context with associated RABs are released; or a message related to configuration of one or more RABs. The control process is a RAB setup, a RAB resume, a RAB suspend or a RAB release.

The control node 12 may comprise an identifying module 703. The control node 12, the processing circuitry 701, and/or the identifying module 703 is configured to identify the more than one RAB, to perform the control process on, for the at least one wireless device, e.g. the wireless device 10. The control node 12, the processing circuitry 701, and/or the identifying module 703 may be configured to identify more than one RAB, to perform the control process on, for more than one wireless device.

The control node 12 may comprise a bundling module 704. The control node 12, the processing circuitry 701, and/or the bundling module 704 is configured to bundle the control information associated with the identified more than one RAB in the control signal.

The control node 12 may comprise a providing module 705, e.g. a transmitter or a transceiver. The control node 12, the processing circuitry 701, and/or the providing module 705 is configured to provide to the process node 14, the control signal for the identified more than one RAB. The control node 12, the processing circuitry 701, and/or the providing module 705 may be configured to provide the control signal for the bundled more than one RAB by being configured to transmit the control signal to the process node 14.

The control node 12 may comprise a receiving module 706, e.g. a receiver or the transceiver. The control node 12, the processing circuitry 701, and/or the receiving module 706 may be configured receive the response associated with the control signal. The response may comprise bundled confirmations and/or rejections of the control process for one or more RABs.

The control node 12 further comprises a memory 707 comprising one or more memory units. The memory 707 comprises instructions executable by the processing circuitry 701 to perform the methods herein when being executed in the control node 12. The memory 707 is arranged to be used to store e.g. information, data such as RAB information, service information, wireless device information, packet information, etc.

The methods according to the embodiments described herein for the control node 12 are respectively implemented by means of e.g. a computer program 708 or a computer program product, comprising instructions, i.e., software code portions, which, when executed on at least one processor, cause the at least one processor to carry out the actions described herein, as performed by the control node 12. The computer program 708 may be stored on a computer-readable storage medium 709, e.g. a disc, a USB, or similar. The computer-readable storage medium 709, having stored thereon the computer program, may comprise the instructions which, when executed on at least one processor, cause the at least one processor to carry out the actions described herein, as performed by the control node 12. In some embodiments, the computer-readable storage medium may be a non-transitory computer-readable storage medium. Thus, the control node 12 may comprise the processing circuitry and the memory, said memory comprising instructions executable by said processing circuitry whereby said control node is operative to perform the methods herein.

Figure 8:
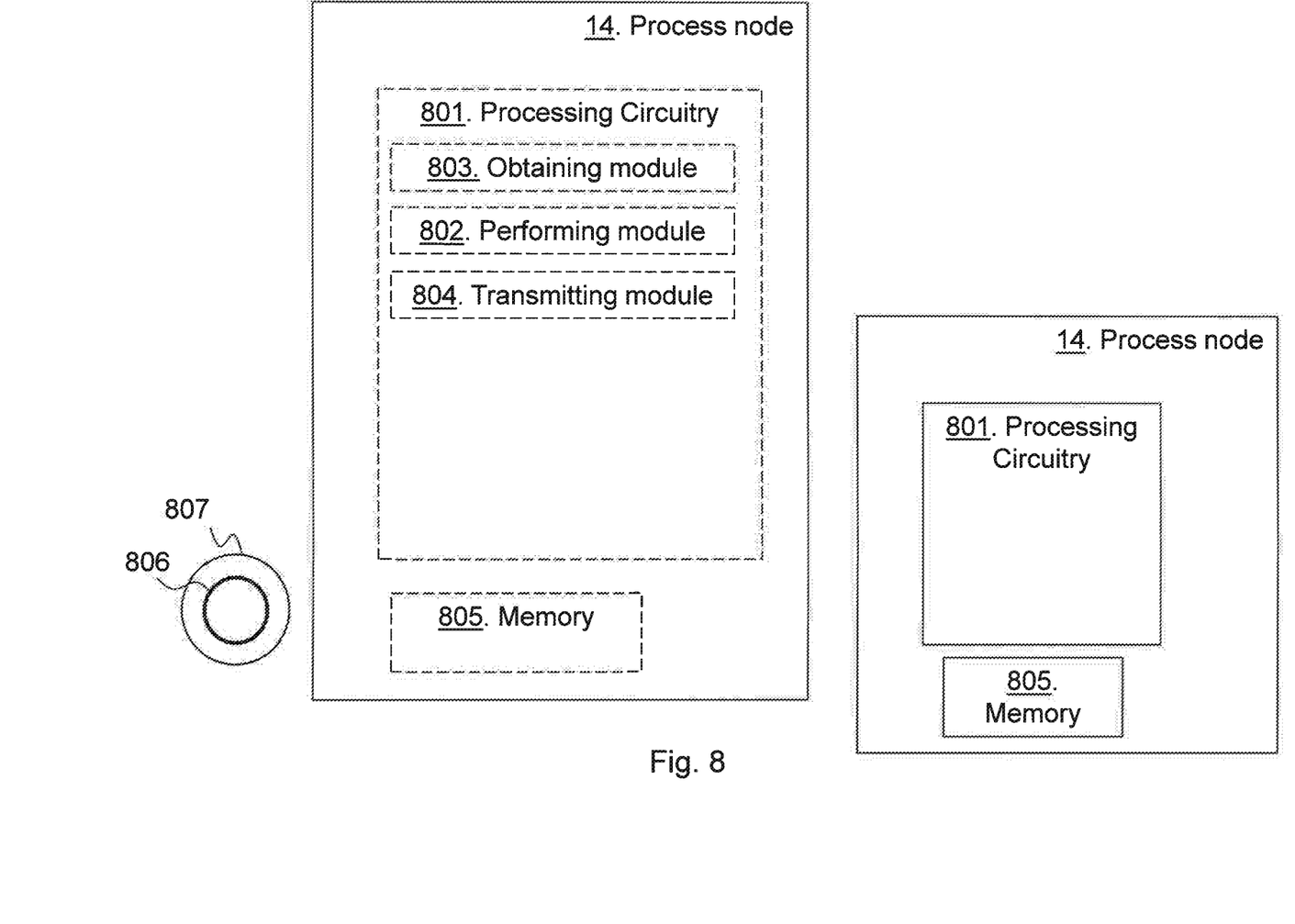
FIG. 8 shows a block diagram depicting a process node according to embodiments herein.

FIG. 8 is a schematic block diagram depicting the process node 14 for handling communication of data of one or more wireless devices in the wireless communications network 1.

The process node 14 may comprise a processing circuitry 801, e.g. one or more processors, configured to perform the methods herein.

The process node 14 may comprise an obtaining module 802, e.g. a receiver or a transceiver. The process node 14, the processing circuitry 801, and/or the obtaining module 802 is configured to obtain from the control node 12, the control signal related to the control process on RABs, which control signal comprises control information associated with more than one RAB for at least one wireless device.

The process node 14 may comprise a performing module 803. The process node 14, the processing circuitry 801, and/or the performing module 803 is configured to perform the control process based on the received control signal.

The process node 14 may comprise a transmitting module 804. The process node 14, the processing circuitry 801, and/or the transmitting module 804 may be configured to transmit to the control node 12, the response associated with the control signal. The response may comprise bundled confirmations and/or rejections of the control process for one or more RABs. The response may be for one or more wireless devices.

The process node 14 further comprises a memory 805 comprising one or more memory units. The memory 805 comprises instructions executable by the processing circuitry 801 to perform the methods herein when being executed in the process node 14. The memory 805 is arranged to be used to store e.g. information, data such as RAB information, service information, wireless device information, packet information, etc.

The methods according to the embodiments described herein for the process node 14 are respectively implemented by means of e.g. a computer program 806 or a computer program product, comprising instructions, i.e., software code portions, which, when executed on at least one processor, cause the at least one processor to carry out the actions described herein, as performed by the process node 14. The computer program 806 may be stored on a computer-readable storage medium 807, e.g. a disc, a USB, or similar. The computer-readable storage medium 807, having stored thereon the computer program, may comprise the instructions which, when executed on at least one processor, cause the at least one processor to carry out the actions described herein, as performed by the process node 14. In some embodiments, the computer-readable storage medium may be a non-transitory computer-readable storage medium. Thus, the process node 14 may comprise the processing circuitry and the memory, said memory comprising instructions executable by said processing circuitry whereby said process node is operative to perform the methods herein.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a control node, where the control node is a central unit-control plane (CU-CP), for handling communication of data of one or more wireless devices in a wireless communications network, the method comprises:
    triggering a control process on radio access bearers (RAB), wherein the control process is triggered by receiving a message relating to a process associated with at least one RAB, wherein the message is:
        a request from a core network node, via a control plane interface, to create a wireless device context in a distributed radio network node with a set of RABs for the wireless device;
        a request from the core network node, via the control plane interface, to remove a wireless device context with associated RABs in a distributed radio network node; or
        a message related to a fault scenario resulting in a cleanup procedure where the wireless device context with associated RABs is released,
        wherein the control process is a RAB setup, a RAB resume, a RAB suspend, or a RAB release;
    identifying more than one RAB, to perform the control process on, for at least one wireless device;
    bundling control information associated with the identified more than one RAB in a control signal;
    sending to a process node, where the process node is a central unit-user plane (CU-UP) node, the control signal for the identified more than one RAB; and receiving a response from the process node associated with the control signal, wherein the response comprises bundled confirmations, rejections, or both confirmations and rejections of the control process for one or more RABs.

2. The method according to claim 1, wherein the identifying more than one RAB comprises identifying more than one RAB, to perform the control process on, for more than one wireless device.

3. The method according to claim 1, wherein the sending the control signal for the bundled control information comprises transmitting the control signal to the process node.

4. A method performed by a process node, where the process node is a central unit-user plane (CU-UP) node, for handling communication of data of one or more wireless devices in a wireless communications network, the method comprises:
receiving from a control node, in which the control node is a central unit-control plane (CU-CP) node, a control signal related to a control process on radio access bearers (RAB), wherein the control process is triggered by the control node in response to a message relating to a process associated with at least one RAB, wherein the message is:
a request from a core network node, via a control plane interface, to create a wireless device context in a distributed radio network node with a set of RABs for the wireless device;
a request from the core network node, via the control plane interface, to remove a wireless device context with associated RABs in a distributed radio network node; or
a message related to a fault scenario resulting in a cleanup procedure where the wireless device context with associated RABs is released,
wherein the control process is a RAB setup, a RAB resume, a RAB suspend, or a RAB release; and
wherein the control signal bundles control information associated with more than one RAB for at least one wireless device;
performing the control process based on the received control signal; and
transmitting to the control node, a response associated with the control signal, wherein the response comprises bundled confirmations, rejections, or both confirmations and rejections, of the control process for one or more RABs and wherein the response is for one or more wireless devices.

5. A control node for handling communication of data of one or more wireless devices in a wireless communications network, where the control node is a central unit-control plane (CU-CP) node, the control node comprising:
processing circuitry; and
a memory comprising instructions which, when executed by the processing circuitry, cause the control node to:
trigger a control process on radio access bearers (RAB), wherein the control process is triggered by receiving a message relating to a process associated with at least one RAB, wherein the message is:
a request from a core network node, via a control plane interface, to create a wireless device context in a distributed radio network node with a set of RABs for the wireless device;
a request from the core network node, via the control plane interface, to remove a wireless device context with associated RABs in a distributed radio network node; or
a message related to a fault scenario resulting in a cleanup procedure where the wireless device context with associated RABs is released,
wherein the control process is a RAB setup, a RAB resume, a RAB suspend, or a RAB release;
identify more than one RAB, to perform the control process on, for at least one wireless device;
bundle control information associated with the identified more than one RAB in a control signal;
send to a process node, where the process node is a central unit-user plane (CU-UP) node, the control signal for the identified more than one RAB; and
receive a response from the process node associated with the control signal, wherein the response comprises bundled confirmations, rejections, or both confirmations and rejections of the control process for one or more RABs.

6. The control node according to claim 5, further to identify more than one RAB, to perform the control process on, for more than one wireless device.

7. The control node according to claim 5, further to send the control signal for the bundled control information by being configured to transmit the control signal to the process node.

8. A process node for handling communication of data of one or more wireless devices in a wireless communications network, where the process node is a central unit-user plane (CU-UP) node, the process node comprising:
processing circuitry; and
a memory comprising instructions which, when executed by the processing circuitry, cause the process node to:
receive from a control node, in which the control node is a central unit-control plane (CU-CP) node, a control signal related to a control process on radio access bearers (RAB), wherein the control process is triggered by the control node in response to a message relating to a process associated with at least one RAB, wherein the message is:
a request from a core network node, via a control plane interface, to create a wireless device context in a distributed radio network node with a set of RABs for the wireless device;
a request from the core network node, via the control plane interface, to remove a wireless device context with associated RABs in a distributed radio network node; or
a message related to a fault scenario resulting in a cleanup procedure where the wireless device context with associated RABs is released,
wherein the control process is a RAB setup, a RAB resume, a RAB suspend, or a RAB release; and
wherein the control signal bundles control information associated with more than one RAB for at least one wireless device;
perform the control process based on the received control signal; and
transmit to the control node, a response associated with the control signal, wherein the response comprises bundled confirmations, rejections, or both confirmations and rejections, of the control process for one or more RABs and wherein the response is for one or more wireless devices.

9. A non-transitory machine-readable storage medium comprising instructions which, when executed on at least one processor of a control node, where the control node is a central unit-control plane (CU-CP), for handling communication of data of one or more wireless devices in a wireless communications network, are capable of causing the control node to perform operations comprising:

triggering a control process on radio access bearers (RAB), wherein the control process is triggered by receiving a message relating to a process associated with at least one RAB, wherein the message is:
- a request from a core network node, via a control plane interface, to create a wireless device context in a distributed radio network node with a set of RABs for the wireless device;
- a request from the core network node, via the control plane interface, to remove a wireless device context with associated RABs in a distributed radio network node; or
- a message related to a fault scenario resulting in a cleanup procedure where the wireless device context with associated RABs is released, wherein the control process is a RAB setup, a RAB resume, a RAB suspend, or a RAB release;

identifying more than one RAB, to perform the control process on, for at least one wireless device;

bundling control information associated with the identified more than one RAB in a control signal;

sending to a process node, where the process node is a central unit-user plane (CU-UP) node, the control signal for the identified more than one RAB; and receiving a response from the process node associated with the control signal, wherein the response comprises bundled confirmations, rejections, or both confirmations and rejections of the control process for one or more RABs.

10. A non-transitory machine-readable storage medium comprising instructions which, when executed on at least one processor of a process node, where the process node is a central unit-user plane (CU-UP) node, for handling communication of data of one or more wireless devices in a wireless communications network, are capable of causing the process node to perform operations comprising:

receiving from a control node, in which the control node is a central unit-control plane (CU-CP) node, a control signal related to a control process on radio access bearers (RAB), wherein the control process is triggered by the control node in response to a message relating to a process associated with at least one RAB, wherein the message is:
- a request from a core network node, via a control plane interface, to create a wireless device context in a distributed radio network node with a set of RABs for the wireless device;
- a request from the core network node, via the control plane interface, to remove a wireless device context with associated RABs in a distributed radio network node; or
- a message related to a fault scenario resulting in a cleanup procedure where the wireless device context with associated RABs is released, wherein the control process is a RAB setup, a RAB resume, a RAB suspend, or a RAB release; and wherein the control signal bundles control information associated with more than one RAB for at least one wireless device;

performing the control process based on the received control signal; and transmitting to the control node, a response associated with the control signal, wherein the response comprises bundled confirmations, rejections, or both confirmations and rejections, of the control process for one or more RABs and wherein the response is for one or more wireless devices.

* * * * *